(12) United States Patent
Banerjee et al.

(10) Patent No.: US 11,348,023 B2
(45) Date of Patent: May 31, 2022

(54) IDENTIFYING LOCATIONS AND CAUSES OF NETWORK FAULTS

(71) Applicant: CISCO TECHNOLOGY, INC., San Jose, CA (US)

(72) Inventors: Ayan Banerjee, Fremont, CA (US); Nataraj Batchu, Sunnyvale, CA (US); Ankan Ghosh, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 470 days.

(21) Appl. No.: 16/281,405

(22) Filed: Feb. 21, 2019

(65) Prior Publication Data

US 2020/0272923 A1    Aug. 27, 2020

(51) Int. Cl.
*H04L 12/24* (2006.01)
*G06N 7/00* (2006.01)
*G06N 20/10* (2019.01)
*H04L 41/142* (2022.01)
*H04L 41/147* (2022.01)
*H04L 41/0677* (2022.01)

(52) U.S. Cl.
CPC .............. *G06N 7/005* (2013.01); *G06N 20/10* (2019.01); *H04L 41/0677* (2013.01); *H04L 41/142* (2013.01); *H04L 41/147* (2013.01)

(58) Field of Classification Search
CPC ........ G06N 7/005; G06N 20/10; G06N 20/20; G06N 5/003; H04L 41/142; H04L 41/147; H04L 41/0677; H04L 41/16
See application file for complete search history.

(56) References Cited

U.S. PATENT DOCUMENTS

| 8,402,543 | B1 | 3/2013 | Ranjan |
| 8,417,715 | B1 | 4/2013 | Bruckhaus |
| 2004/0168100 | A1* | 8/2004 | Thottan ................. H04L 41/065 714/4.1 |
| 2012/0005532 | A1* | 1/2012 | Li ........................ G06F 11/0709 714/26 |
| 2014/0189436 | A1* | 7/2014 | Sadaphal ............ G06F 11/0709 714/45 |
| 2015/0023151 | A1* | 1/2015 | Liu ...................... H04L 41/0681 370/218 |
| 2017/0011308 | A1 | 1/2017 | Sun |
| 2017/0353991 | A1 | 12/2017 | Tapia |
| 2018/0174062 | A1* | 6/2018 | Simo .................... G06N 3/0454 |
| 2018/0268142 | A1 | 9/2018 | Sethumadhavan |
| 2019/0196920 | A1* | 6/2019 | Andrade Costa ... G06F 11/1438 |
| 2020/0213236 | A1* | 7/2020 | Safavi ................. H04L 41/0654 |

* cited by examiner

Primary Examiner — Gil H. Lee
Assistant Examiner — Juan C Turriate Gastulo
(74) Attorney, Agent, or Firm — Lee & Hayes, P.C.

(57) ABSTRACT

Customized feature vectors are used to train a machine learning algorithm to automatically identify a network component where a network fault has occurred. A database comprising network components and associated network faults is analyzed to select a set of network components associated with the largest quantity of network faults. Customized features associated with the network faults are identified and selected for use in a feature vector as input to a machine learning algorithm. The features are selected based upon analysis of consistency checks, component configuration limits, and network wide configurations.

18 Claims, 5 Drawing Sheets

IDENTIFYING LOCATIONS AND CAUSES OF NETWORK FAULTS

TECHNICAL FIELD

This disclosure relates to using a customized set of feature vectors as input to a machine learning algorithm to automatically identify the location and predict the cause of network faults.

BACKGROUND

In conventional network technologies, customers are accustomed to automated deployment of physical nodes, configurations, and management functions. Conventional network switches send large amounts of data; however, conventional networks cannot extract relevant, intelligent information to identify network faults. In conventional systems, identifying and correcting network faults involves manually identifying the flow impacted at the network entity, the primary switch for the fault, the set of underlying events leading up to the fault, and the network component or trigger that correlates to the events with the reported flows or symptoms. Conventional systems cannot automatically diagnose and remediate network faults.

DETAILED DESCRIPTION

Overview

Figure 1:
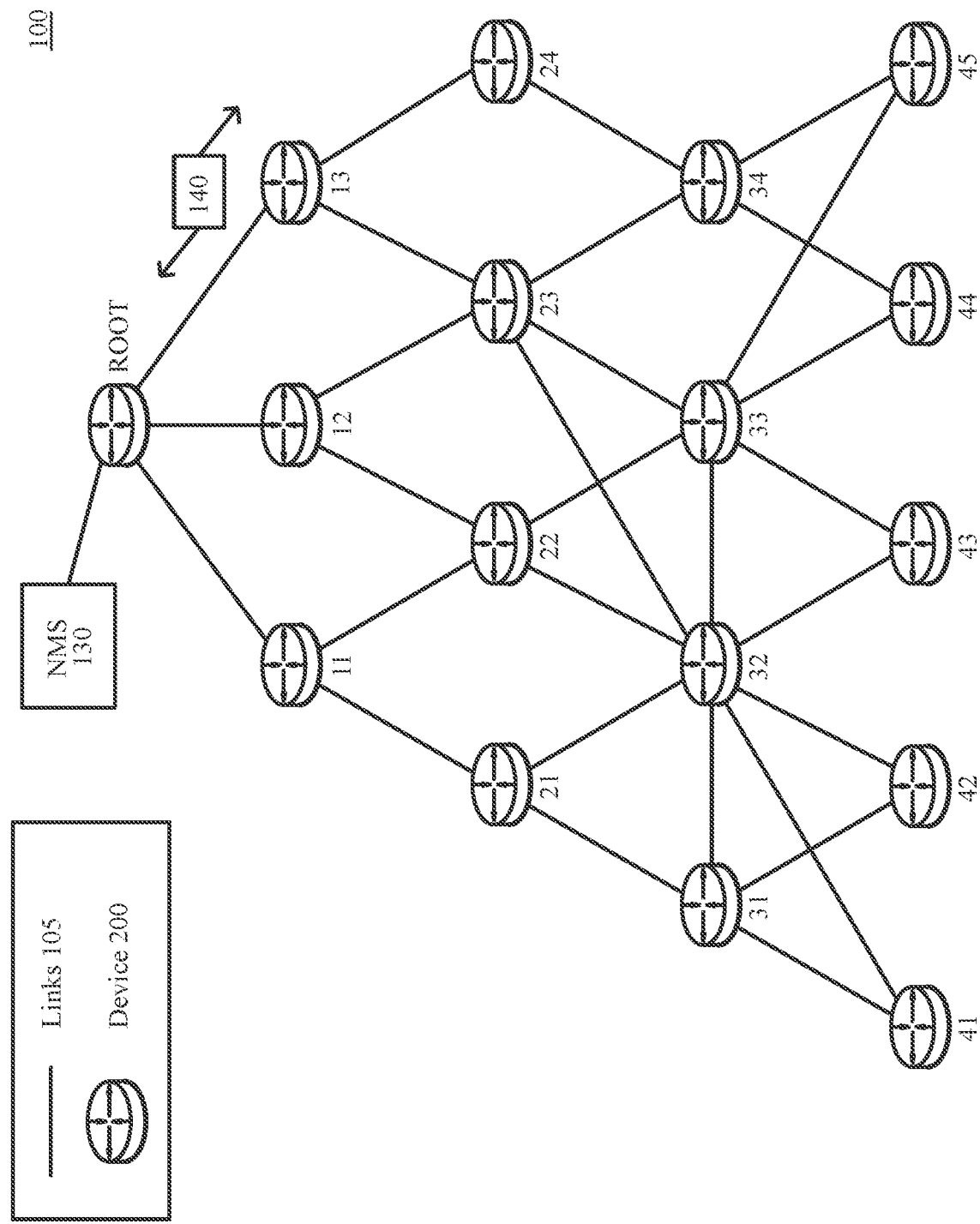
FIG. 1 is a diagram depicting an example distributed computing network, in accordance with certain examples.

When a computer network is deployed, network errors often occur. A network error may be an error, flaw, failure, or fault which causes the network to produce an incorrect or unexpected result. A network error can result from a coding error that occurs in a computer program. A network error may occur as the result of conflicts in software when multiple applications try to run in tandem. If the network error can be associated with a known network fault and with a specific network component, the network error may be resolved. A network component may include, but is not limited to, routers, switches, network hubs, wireless access points, network cables, network servers, and network interface cards. One of the primary objectives in network deployment is the accurate and prompt resolution of network errors.

The technology described herein provides techniques to automatically diagnose network errors by automatically associating the network errors with known network faults and specific network components through the use of machine learning algorithms or artificial intelligence. The machine learning algorithm may be a Random Forest Search ("RFS") or any other suitable machine learning algorithm. The machine learning algorithm utilizes training data in the form of feature vectors to make predictions or decisions. A feature vector is an n-dimensional vector consisting of numerical features that represent each network fault. The quantity "n" represents the quantity of features included in the feature vector. In this technology, a machine learning algorithm may be trained to automatically identify network errors and to associate the network errors with a specific network component allowing for faster resolution of the network errors. Upon the receipt of a report of a network error, the output of the machine learning algorithm may be the type of network fault and the specific component to which the network fault belongs.

A computing device obtains training data through the use of stored historical data related to previous network deployments and network faults. The computing device may include a server, desktop computer, laptop computer, tablet computer, or any other wired or wireless, processor-driven device. The computing device may comprise a third-party server or a computing system maintained by a technical assistance center ("TAC"). The historical data may be obtained by scanning system log messages or any other suitable method to obtain the historical data. The historical data may be stored in a database or other suitable storage location. The historical data contains data related to network faults occurring at specific network component locations. In an example network deployment, a network may contain 200 or more network components and may incur 12,000 to 15,000 network errors. Incorporating all of the historical data would create a very large input feature vector set, which may result in overfitting. With respect to a machine learning algorithm, overfitting is the production of an analysis that corresponds too closely or exactly to the training data. Overfitting may occur when the training data set is too large and may cause the machine learning algorithm to fail to fit additional data or fail to predict future observations reliably. The technology described herein creates a customized set of feature vectors to target the network components most likely to incur network errors, thereby eliminating the problem of overfitting through the selected use of the historical data and increasing the accuracy of the output of the machine learning algorithm.

To create a customized set of feature vectors, the computing device selects a quantity of data to be used in the training data based upon a selective reduction of the historical data. The network components where network faults are most likely to occur are selected to reduce the quantity of network components utilized in the customized set of feature vectors. The network components where network faults are most likely to occur may be automatically selected by the computing device based upon database query results. The computing device may automatically select the network components based upon an established probability threshold, a probability distribution model, a specified quantity of network components, or any other suitable method to select the network components. The network components may also be manually selected to be included in the customized feature vector set.

To determine the features to include in the customized set of feature vectors, the computing device may identify and analyze the root causes of previous network faults. The root causes of network faults may be identified based upon an analysis of the historical data and results of consistency checking. Consistency checking is a mechanism that may determine inconsistencies in network components. Root causes of network faults may be attributed to hardware and software operating asynchronously, network components operating above or below component configuration limits, or to network wide configuration settings. Root causes of network faults may be determined by analyzing critical system logs and event traces. Alternatively, root causes of network faults may be determined manually based upon domain knowledge of the deployed network.

Utilizing the selected network components and the root causes of network faults, the computing device selects the features to be included in the customized set of feature vectors. The computing device selects the features to be included in the customized set of feature vectors based upon a determination of the relevant features associated with a given network fault. The selected features include quantifiable features associated with each network fault. The quantifiable features may describe symptoms and conditions associated with each network fault. The quantity of selected features determines the size of each feature vector.

The computing device populates the customized set of feature vectors with data via feature extraction at network fault locations and a periodic scan of resolved network faults. A feature extraction software application operating on the computing device extracts the features selected for each network fault. The feature extraction may reduce the amount of resources required to describe a large set of data through the selection of features which are informative and non-redundant. The feature extraction software application generates a tag length and value ("TLV") formatted American Standard Code for Information Interchange ("ASCII") file as an output containing an attribute-value pair for each network fault. An attribute-value pair may also be known as a name-value pair, key-value pair, or field-value pair. An attribute-value pair is a representation of data which contains a name or "attribute" for the data and an associated "value" for the data. The feature extraction file is attached to each identified network fault. The feature extraction file may be stored in a database or any other suitable storage location.

The computing device then conducts a periodic scan to obtain the extracted features to create the set of customized feature vectors and identify the network component associated with each resolved network fault. A comma separated value ("CSV") file is created to store the output of the scan, which comprises the feature vector and the associated network component for each identified network fault. The feature vector and the associated network component associated with a given network fault comprise the training data for input into the machine learning algorithm. The training data is input into a network fault identification application containing the machine learning algorithm. The network fault identification application may be stored and initialized on a server, available over an Internet connection, available through a cloud service provider, or any other suitable method to access the application. Upon receipt of a report of a network fault, the machine learning algorithm contained within the network fault identification application identifies utilizes the training data to determine the network component most likely associated with each network fault reported and displays the network component associated with the network fault for further analysis.

In conventional systems, the systems are not capable of automatically diagnosing and remediating network faults. Machine learning or artificial intelligence algorithms may be developed to automatically predict the location of network faults but suffer problems with overfitting and unreliable predictions. The technology described herein creates a customized set of feature vectors to target the network components most likely to incur network errors. Utilizing a customized set of feature vector as input into a machine learning algorithm eliminates the problem of overfitting and increases the accuracy of the output of the machine learning algorithm. Identifying a source of the network fault shortens network downtime and makes network repairs faster and easier.

These and other aspects, objects, features, and advantages of the examples will become apparent to those having ordinary skill in the art upon consideration of the following detailed description of illustrated examples.

Example System Architecture

Referring to the drawings, in which like numerals represent like (but not necessarily identical) elements throughout the figures, example embodiments are described in detail.

The operations described with respect to any of the FIGS. 1-5 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

A computer network is a geographically distributed collection of nodes interconnected by communication links and segments for transporting data between end nodes. Nodes and end nodes include, for example, personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network that is generally considered a self-configuring network of mobile routes (and associated hosts) connected by wireless links, the union of which forms an arbitrary topology.

Smart object networks, such as sensor networks, are a specific type of network having spatially distributed autonomous devices, such as sensors, actuators, etc., that cooperatively monitor physical or environmental conditions at different locations, such as, for example, energy/power consumption, resource consumption (for example, water/gas/etc. for advanced metering infrastructure or "AMI" applications), temperature, pressure, vibration, sound, radiation, motion, pollutants, etc. Other types of smart objects include actuators, for example, responsible for turning on/off an engine or performing any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port (such as PLC), a microcontroller, and an energy source (such as a battery). Often, smart object networks are considered field area networks (FANs), neighborhood area networks (NANs), etc.

Generally, size and cost constraints on smart object nodes (for example, sensors) result in corresponding constraints on resources, such as energy, memory, computational speed, and bandwidth.

Mesh networks have become increasingly popular and practical in recent years. In particular, shared-media mesh networks, such as wireless or PLC networks, etc., are often on what is referred to as Low Power and Lossy Networks (LLNs). LLNs are a class of network in which both the routers and their interconnects are constrained: LLN routers typically operate with constraints (for example, processing power, memory, and/or energy (battery)), and their interconnects are characterized by, illustratively, high loss rates, low data rates, and/or instability. LLNs are comprised of anything from a few dozen or up to thousands or even millions of LLN routers. Additionally, LLN's support point-to-point traffic (between devices inside the LLN), point-to-multipoint traffic (from a central control point, such as the root node, to a subset of devices inside the LLN), and multipoint-to-point traffic (from devices inside the LLN towards a central control point).

Loosely, the term "Internet of Things" or "IoT" may be used by those in the network field to refer to uniquely identifiable objects (things) and their virtual representations in a network-based architecture. The "Internet of Things" generally refers to the interconnection of objects (for example, smart objects), such as sensors and actuators, over a computer network (for example, internet protocol ("IP")), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, building and industrial automation, and cars (for example, that can interconnect millions of objects for sensing things like power quality, tire pressure, and temperature, and that can actuate engines and lights), it has been of the utmost importance to extend the IP protocol suite for these networks.

FIG. 1 is a schematic block diagram of an example computer network 100 illustratively comprising nodes/devices 200 (for example, labeled as shown, "root," "11," "12," . . . "45," and described in FIG. 2 below) interconnected by various methods of communication. For instance, the links 105 may be wired links or shared media (for example, wireless links, PLC links, etc.) where certain nodes 200 (such as, for example, routers, sensors, computers, etc.) may be in communication with other nodes 200, for example, based on distance, signal strength, current operational status, location, etc. Those skilled in the art will understand that any number of nodes, devices, links, etc. may be used in the computer network 100 and that the view illustrated herein is for simplicity. Also, those skilled in the art will further understand that while the network 100 is shown in a certain orientation, particularly with a "root" node, the network 100 is merely an example illustration that is not meant to limit the disclosure. In addition, a network management server ("NMS") 130, or other head-end application device located beyond the root device (for example, via a WAN), may also be in communication with the network 100.

NMS 130 may involve the use of distributed databases, auto-polling of network devices, automatic isolation of problem devices along with replication of the function of troubled devices in other network elements, and high-end workstations generating real-time graphical views of network topology changes, events (including failures), and traffic. In general, the NMS 130 may employ a variety of tools, applications, and devices to assist human network managers in monitoring and maintaining networks.

Most NMS 130 architectures use the same basic structure and set of relationships. The NMS 130 may contain managed devices, such as computer systems and other network devices, which run software that enables them to send alerts, typically in the form of network log entries, when the managed devices detect problems. The NMS 130 may also contain management entities which are programmed to react by executing one, several, or a group of actions, including operator notification, event logging, shutdown and replacement of faulty processes and devices, and other automatic attempt at system repair.

Data packets 140 (for example, traffic and/or messages sent between the devices/nodes) may be exchanged among the nodes/devices of the computer network 100 using predefined network communication protocols, such as certain known wired protocols, wireless protocols (for example, WiFi, Bluetooth®, etc.), PLC protocols, or other shared-media protocols where appropriate. In this context, a protocol comprises of a set of rules defining how the nodes interact with each other.

Figure 2:
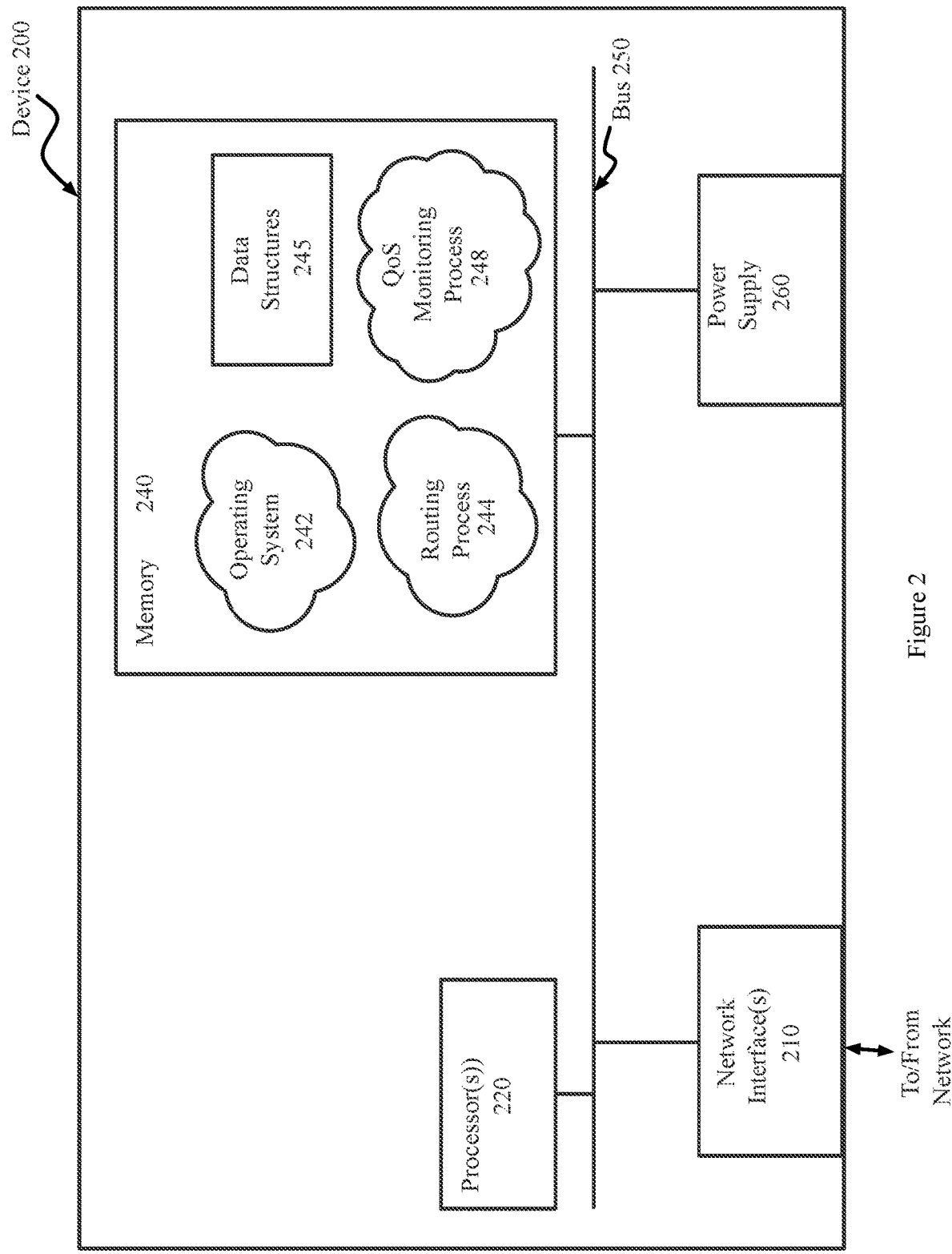
FIG. 2 is a block diagram depicting an example network device/node, in accordance with certain examples.

FIG. 2 is a schematic block diagram of an example node/device 200 that may be used with one or more embodiments described herein, for example, as any of the nodes shown in FIG. 1 above. The device 200 may comprise one or more network interfaces 210 (for example, wired, wireless, PLC, etc.), at least one processor 220, and a memory 240 interconnected by a system bus 250, as well as a power supply 260 (for example, battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes 200 may have multiple types of network connections, for example, wireless and wired/physical connections, and that the view depicted herein is merely for illustration. Also, while the network interface 210 is shown separately from the power supply 260, the network interface 210 may communicate through the power supply 260 or may be an integral component of the power supply, for example, for PLC. In some specific configurations, the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (for example, no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor 220, functionally organizes the device by, inter alia, invoking operations in support of software processes and/or services executing on the device. These software processes and/or services may comprise routing process/services 244 and an illustrative quality of service ("QoS") monitoring process 248. Note that while QoS monitoring process 248 is shown in centralized memory 240, the process may be operated within the network interfaces 210, such as a component of a network layer operation within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (for example, according to the functionality of a similar process). Further, while the processes have been shown separately, those skilled in the art will appreciate that processes may be routines or modules within other processes.

Example Processes

Figure 3:
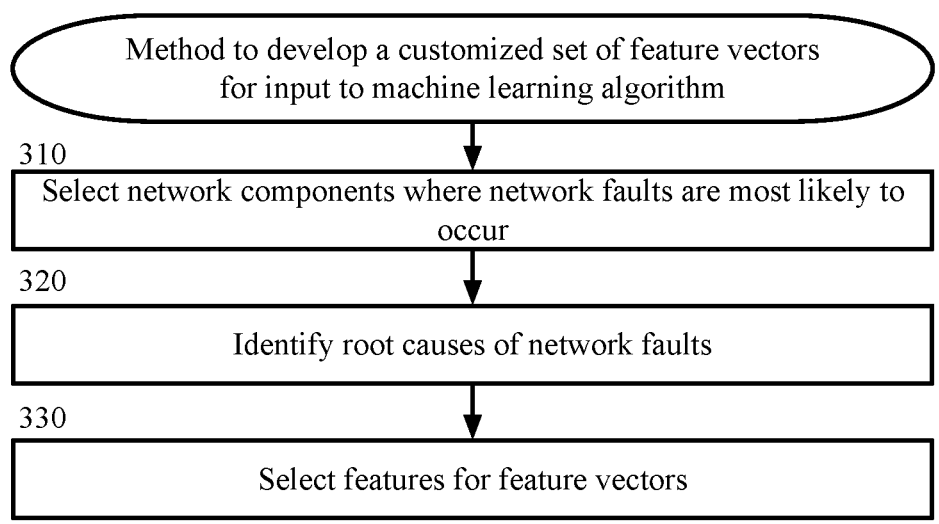
FIG. 3 is a block flow diagram depicting a method to develop feature vectors for input into a machine learning algorithm, in accordance with certain examples.
Figure 4:
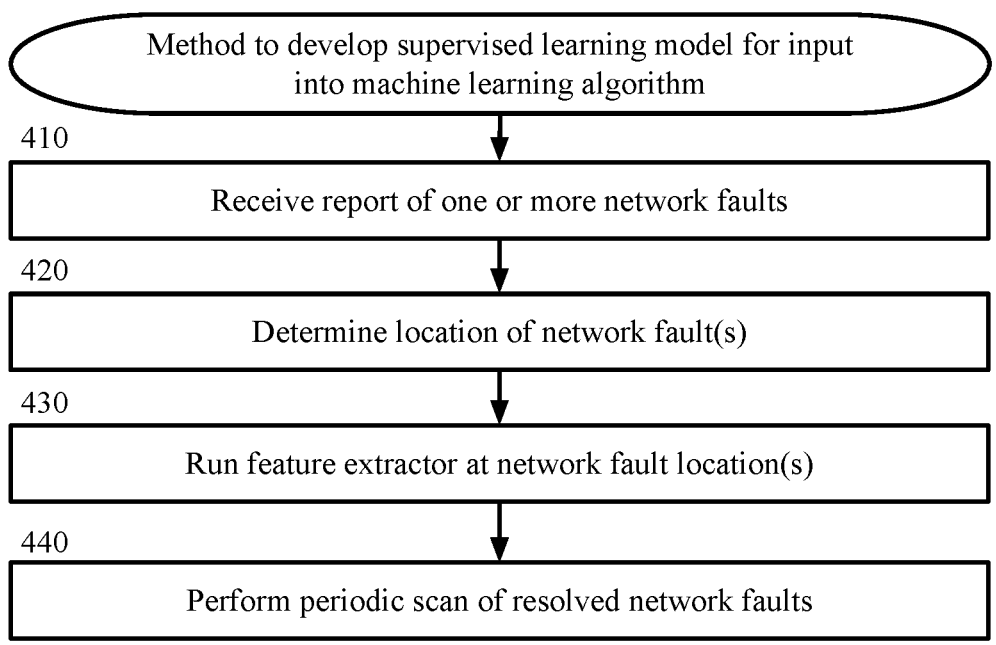
FIG. 4 is a block flow diagram depicting a method to develop a supervised learning model for input into a machine learning algorithm, in accordance with certain examples.
Figure 5:
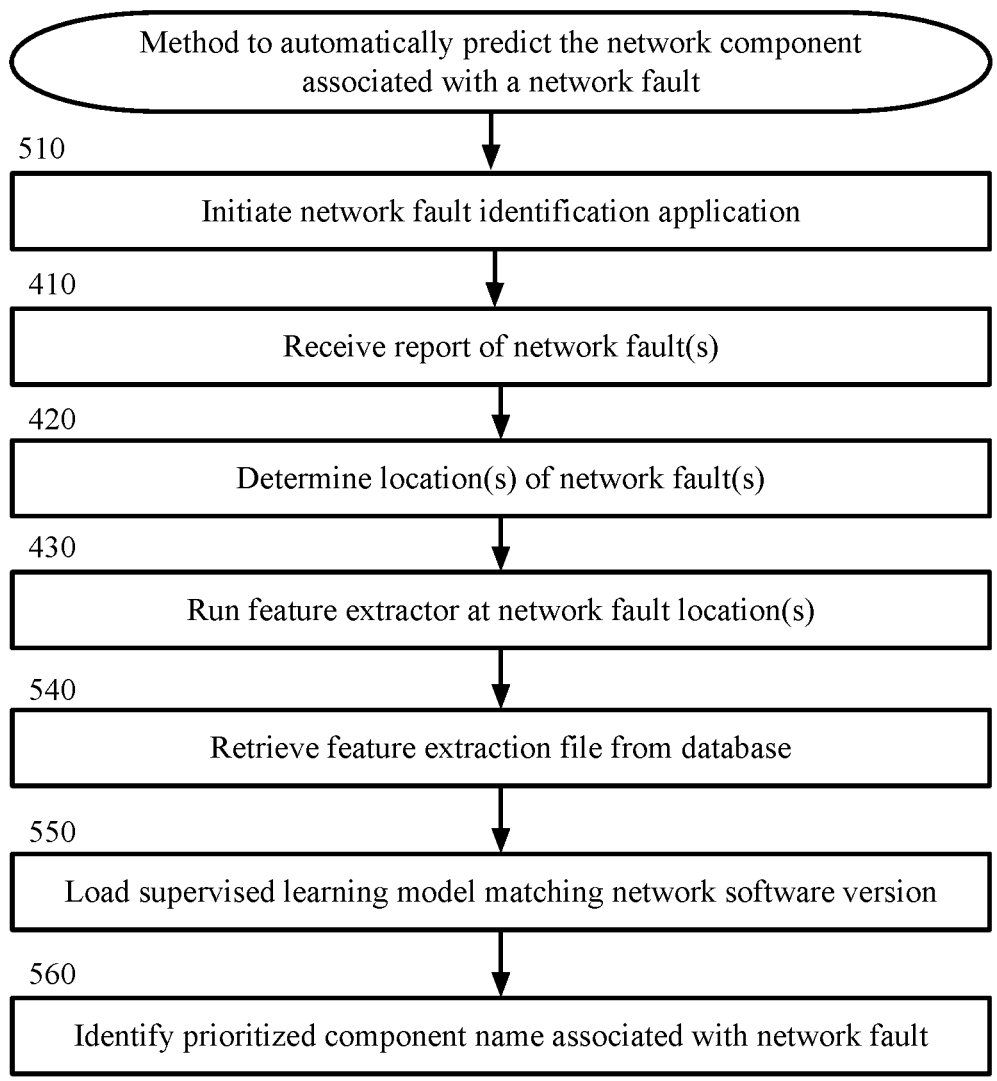
FIG. 5 is a block flow diagram depicting a method to automatically predict the cause of a network fault using a supervised learning model, in accordance with certain examples.

The example methods illustrated in FIGS. 3-5 are described hereinafter with respect to the components of the example computer network 100. The components of the example computer network 100 may include, but are not limited to, routers, switches, network hubs, wireless access points, network cables, network servers, and network interface cards. The example methods of FIGS. 3-5 may also be performed with other systems and in other environments. The operations described with respect to any of the FIGS. 3-5 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

FIG. 3 is a block flow diagram depicting a method 300 to develop a customized set of feature vectors for input to machine learning algorithms, in accordance with certain examples. The feature vectors are associated with network faults. A feature is a measurable property or characteristic of the network fault. A set of features may be described by a feature vector. A feature vector is an n-dimensional vector consisting of numerical features that represent each network fault. The quantity "n" represents the quantity of features included in the feature vector. A network fault may be any error, flaw, failure, or fault which causes the network to produce an incorrect or unexpected result.

In block 310, a computing system, such as the NMS 130, selects the network components where network faults are most likely to occur. The computing system may be the NMS 130, a third-party server, a computing device operated by a technical assistance center ("TAC"), or any other suitable computing system or device. A computing device may include a server, desktop computer, laptop computer, tablet computer, or any other wired or wireless, processor-driven device. The NMS 130 may select the network components where network faults are most likely to occur based upon an analysis of historical data. Historical data may be collected from previous network deployments and may be analyzed to determine the quantity of network faults occurring at each network component. The historical data may be stored in a database or any other suitable storage location. The database may be comprised of data describing each type of network fault including, but not limited to, a network fault identifier, one or more products or software associated with each network fault, one or more components associated with each network fault, and one or more specific network release version associated with each network fault. The NMS 130 may query the database to identify the quantity of network faults associated with specific network components. The database may be queried based upon the network fault identifier, keywords associated with a network fault, products and/or software in use when the network fault occurred, or the network release version in use when the network fault occurred. The NMS 130 may sort the query results in an order most closely matching the search criteria.

The NMS 130 may automatically select the network components where network faults are most likely to occur based upon the database query results. The NMS 130 may automatically select the network components based upon an established probability threshold. The query results may indicate the quantity of network faults occurring at each network component. The NMS 130 calculates the probability that a network fault occurs at a specific network component based upon the total quantity of network faults. A probability threshold may be established to allow for the automatic selection of network components which are most likely to incur network faults. The probability threshold may be 10%, 15%, or any other suitable probability threshold. The NMS 130 selects network components whose probabilities are greater than or equal to the established probability threshold to be included as input to the machine learning algorithm.

The NMS 130 may automatically select the network components based upon a probability distribution model such as the Pareto distribution model. The NMS 130 analyzes the quantity of network faults occurring at each network component to determine if the distribution of network faults fit a Pareto distribution model. The Pareto distribution model is a probability model wherein approximately 80% of the effects come from approximately 20% of the causes. In the context of network deployment, approximately 80% of the network faults are attributed to approximately 20% of the network components. Using the results of the database query, the NMS 130 calculates the percentage of total network faults for each network component. The NMS 130 ranks the percentages of network faults per component in descending order. The NMS 130 then cumulatively sums the percentages of network faults ranked in descending order until the sum falls within a specified percentage range about the 80% target. The specified range may be ±1%, ±2.5%, ±5% or any other suitable percentage range. The NMS 130 then selects the network components whose percentages of network faults cumulatively sum to the specified range about the 80% target to be included as input to the machine learning algorithm.

The NMS 130 may automatically select the network components based upon a specified quantity of network components. The NMS 130 determines the quantity of network faults occurring at each network component and sorts the network components in descending order based upon the quantity of network faults occurring at the specific network component. The NMS 130 selects the top "k" network components where network faults occur. The value of "k" may be any specified quantity of network faults such as 30, 40, 50, or any other suitable quantity of network faults per network component.

The network components to be included as input to the machine learning algorithm may be manually selected. The network components to be included as input to the machine learning algorithm may be manually selected by qualified personnel including network service technicians, network engineers, network quality assurance personnel, network operators, or any other suitable personnel. The manual selection of network components to be included as input to the machine learning algorithm may be based upon an analysis of the historical data contained in the database.

In block 320, the NMS 130 identifies the root causes of network faults. The root causes of network faults may be identified based upon an analysis of the historical data. The historical data may contain the output of component specific consistency checks. Consistency checking is a mechanism that may determine inconsistencies in network components. Root causes of network faults may be attributed to hardware and software operating asynchronously as indicated by the output of a consistency check. Root causes of network faults may be attributed to network components operating above or below component configuration limits, or to network wide configuration settings. The NMS 130 may determine root causes of network faults by analyzing critical system logs and event traces. Root causes of network faults may be determined manually based upon domain knowledge of the deployed network. The domain knowledge may be based upon operator or programmer historical knowledge of the deployed networks.

In block 330, the NMS 130 selects the features which are to be included in the customized set of feature vectors for input to the machine learning algorithm. The selection of the features to be included in the customized set of feature vectors is based upon a determination of the relevant features associated with a given network fault. The selected features include quantifiable features associated with each network fault. The quantifiable features describe symptoms and conditions associated with the network fault. The NMS 130 may associate the root causes of the network faults from block 320 with the selected network components from block 310 and include those root causes in the features for the feature vectors. The component configuration limits and network wide configurations may be included as features in the feature vector. The NMS 130 may analyze additional data resources to determine relevant features for the feature vectors. Data resources may include command line interfaces ("CLI"), system logs, accounting logs, technical support output, and any other suitable data resources to determine the relevant features associated with a given network fault.

FIG. 4 is a block flow diagram depicting a method 400 to develop a supervised learning model for input into a machine learning algorithm, in accordance with certain examples. The supervised learning model may incorporate the selected features described in greater detail with reference to FIG. 3. The method 400 may be implemented for a specific software version. In block 410, a computing system, such as the NMS 130, receives a report indicating that one or more network faults has occurred. The server may be the NMS 130, a third-party server, a computing device operated by a technical assistance center ("TAC"), or any other suitable computing system or device. The NMS 130 may detect the network faults. The network faults may be reported by a customer or quality assurance personnel. The network faults may be automatically reported to a technical assistance center. Any suitable method of reporting network faults may be used.

After receiving the report of one or more network faults, the method 400 proceeds to block 420. In block 420, the NMS 130 determines the location of the one or more network faults. To determine the location of the one or more network faults, a network path tracing application may be employed by the NMS 130. Any suitable means for determining the location of the one or more network faults may be employed. A network path tracing application may show available paths between network components. The network path tracing application may show all devices and components the path flows through and may include performance data. The network path tracing application may return a list of one or more nodes where the network faults are located.

Upon determining the location of the one or more network faults, the method 400 proceeds to block 430. In block 430, the NMS 130 runs a feature extraction software application at each determined network fault location to identify the type of network fault. The feature extraction software application extracts the features selected for each network fault determined in block 330 as previously described in greater detail with reference to FIG. 3. The feature extraction reduces the amount of resources required to describe a large set of data. The feature extraction process builds derived values or features which are informative and non-redundant related to the network fault. The feature extraction process is a dimensionality reduction process. The feature extraction software application may request an input for the domain in which the network fault is located. The domain may be Layer-2, Layer-3, switched port analyzer ("Span"), virtual extensible LAN ("VxLAN"), or any other suitable input indicating the domain in which the network fault is located. The feature extraction software application may request an input for the file format to export the feature extraction results. The feature extraction identifies the type of network fault present at each network fault location. The feature extraction software application generates a tag length and value ("TLV") formatted American Standard Code for Information Interchange ("ASCII") file as an output. The feature extraction file contains an attribute-value pair for each network fault. An attribute-value pair may also be known as a name-value pair, key-value pair, or field-value pair. An attribute-value pair is a representation of data which contains a name or "attribute" for the data and an associated "value" for the data. The feature extraction file may also contain the consistency check results, the component configuration limits, the network wide configuration settings, the critical system log and event traces, the software version, and the hardware proportional integral derivative ("PID"). The feature extraction file is attached to each identified network fault. The feature extraction file may be stored in a database or any other suitable storage location.

The method 400 proceeds to block 440 where the NMS 130 performs a periodic scan of resolved network faults. For example, the periodic scan may be performed once every 24 hours or once during any other suitable period of time. The scan obtains the features extracted in block 430 to be used as an input to the machine learning algorithm in the form of a feature vector for each network fault. The scan identifies the network component associated with each resolved network fault. The network component associated with the network fault is the output for the machine learning algorithm. A comma separated value ("CSV") file is created to store the output of the scan, which comprises the feature vector and the associated network component for each identified network fault. The CSV file may be stored in a central database or other suitable storage location. The feature vector and the associated network component associated with a given network fault comprise the training data for the machine learning algorithm. The training data is the supervised learning model.

FIG. 5 is a block flow diagram depicting a method 500 to automatically predict the network component associated with a network fault, in accordance with certain examples. In block 510, a network fault identification application is initialized. The network fault identification application may be stored and initialized on a server such as the NMS 130.

The network fault identification application may be available over an Internet connection or a cloud service provider. Any suitable method of accessing the network fault identification application may be used. The network fault identification application contains a machine learning algorithm. The machine learning algorithm may be a Random Forest Search ("RFS") algorithm or any other suitable machine learning algorithm.

The method 500 proceeds to blocks 410, 420, and 430. When one or more network faults occur in a network deployment, the steps recited in blocks 410-430 collect data related to each network fault.

In block 410, the NMS 130 receives a report indicating that one or more network faults has occurred, as described previously in greater detail with respect to FIG. 4. The method proceeds to block 420. In block 420, the NMS 130 determines the location of the one or more network faults, as described previously in greater detail with respect to FIG. 4. The method proceeds to block 430. In block 430, the NMS 130 runs a feature extraction software application at each determined network fault location to identify the type of network fault, as described previously in greater detail with respect to FIG. 4. The output of the feature extraction software application is a feature extraction file, which is stored in a database or other suitable storage location for future access by the network fault identification application.

The method 500 proceeds to block 540. In block 540, the network fault identification application retrieves the feature extraction file from the database. The feature extraction file contains the contents of the feature vector for each network fault. After the feature vector is obtained through the retrieval of the feature extraction file in block 540 for each network fault, the method proceeds to block 550. In block 550, the network fault identification application uses the software version number corresponding to the current network deployment to select and load the appropriate supervised learning model as described in greater detail with respect to method 400. Upon loading the appropriate supervised learning model in block 550, the method proceeds to block 560. The machine learning algorithm contained within the network fault identification application predicts the network component most likely associated with each network fault reported. The machine learning algorithm uses the feature vectors as input and the training data as a learning model to generate an output, the output being the predicted network component associated with a reported network fault. The network component name may be displayed on a user interface for further analysis. The network fault identification application may connect to a server and establish a server sent event ("SSE") connection to obtain technical support for the network fault. The network fault identification application may trigger an alert to notify network technicians or a technical assistance center ("TAC") of the network fault and the associated network component. The NMS 130 may send a diagnostic message to the identified network component. The NMS 130 may divert network communications away from the identified network component until the network fault is resolved. The NMS 130 may reboot the identified network component and any associated network components to resolve the network fault, or any other suitable action to resolve the network fault.

Other Examples

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the examples presented previously are illustrative, and, in alternative examples, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A method, comprising:
   selecting, by one or more computing devices, a set of network components from a plurality of network components, the set comprising two or more network components from the plurality of network components, wherein selecting the set of network components from the plurality of network components further comprises:
   ranking the plurality of network components in descending order from a highest ranked network component sequentially to a lowest ranked network component based upon a quantity of resolved network faults per network component;

calculating a percentage of resolved network faults occurring at each of the plurality of network components;

cumulatively summing the calculated percentages beginning with the calculated percentage of the highest ranked network component and continuing the summation in descending order from the highest ranked network component until the cumulative sum reaches a configured threshold; and selecting the set of network components comprised in the cumulative sum;

generating, by the one or more computing devices, a vector comprising extracted features associated with one or more resolved network faults;

associating, by the one or more computing devices, each particular network component from the set of network components with one or more of the generated vectors;

generating, by the one or more computing devices, training data comprising each particular network component and the associated one or more generated vectors;

receiving, by the one or more computing devices, a notification that a network fault has occurred;

accessing, by the one or more computing devices, a service application running a machine learning algorithm, operation of the machine learning algorithm being based on the generated training data to predict a fault network component associated with the network fault; and receiving, by the one or more computing devices and from the service application, a notification of the fault network component predicted to be associated with the network fault received in the notification.

2. The method of claim 1, wherein selecting the set of network components is based on a probability distribution model.

3. The method of claim 1, wherein generating the vector comprises:

obtaining, by the one or more computing devices, a list of the one or more resolved network faults associated with the set of network components;

identifying, by the one or more computing devices, a location for each of the one or more resolved network faults on the list; and extracting, by the one or more computing devices, features associated with each of the one or more resolved network faults at each of the identified locations.

4. The method of claim 3, wherein the features are quantifiable values.

5. The method of claim 3, wherein the features are associated with causes of the one or more resolved network faults.

6. The method of claim 3, wherein the location of the one or more resolved network faults is determined by a path tracing software application.

7. The method of claim 1, wherein dimensions of the vector are based upon a quantity of the extracted features.

8. The method of claim 1, wherein the service application is a network fault identification application.

9. A computer program product, comprising:

a non-transitory computer-readable medium having computer-readable program instructions embodied thereon, the computer-readable program instructions comprising:

computer-readable program instructions to select a set of network components from a plurality of network components, the set comprising two or more network components from the plurality of network components, wherein selecting the set of network components from the plurality of network components further comprises computer-readable program instructions to:

rank the plurality of network components in descending order from a highest ranked network component sequentially to a lowest ranked network component based upon a quantity of resolved network faults per network component;

calculate a percentage of resolved network faults occurring at each of the plurality of network components;

cumulatively sum the calculated percentages beginning with the calculated percentage of the highest ranked network component and continuing the summation in descending order from the highest ranked network component until the cumulative sum reaches a configured threshold; and select the set of network components comprised in the cumulative sum;

computer-readable program instructions to generate a vector comprising extracted features associated with one or more resolved network faults;

computer-readable program instructions to associate each particular network component from the set of network components with one or more of the generated vectors;

computer-readable program instructions to generate training data comprising each particular network component and the associated one or more generated vectors;

computer-readable program instructions to receive a notification that a network fault has occurred;

computer-readable program instructions to access a service application running a machine learning algorithm, operation of the machine learning algorithm being based on the generated training data to predict a fault network component associated with the network fault; and computer-readable program instructions to receive, from the service application, a notification of the fault network component predicted to be associated with the network fault received in the notification.

10. The computer programming product of claim 9, wherein the computer-readable program instructions to select the set of network components is based on a probability distribution model.

11. The computer programming product of claim 9, wherein the computer-readable program instructions to generate the vector comprises:

computer-readable program instructions to obtain a list of the one or more resolved network faults associated with the set of network components;

computer-readable program instructions to identify a location for each of the one or more resolved network faults on the list; and computer-readable program instructions to extract features associated with each of the one or more resolved network faults at each of the identified locations.

12. The computer programming product of claim 11, wherein the location of the one or more resolved network faults is determined by a path tracing software application.

13. The computer programming product of claim 11, wherein the features are quantifiable values.

14. The computer programming product of claim 11, wherein the features are associated with causes of the one or more resolved network faults.

15. A system, comprising:
a storage device; and
a processor communicatively coupled to the storage device, wherein the processor executes application code instructions that are stored in the storage device to cause the system to:
- select a set of network components from a plurality of network components, the set comprising two or more network components from the plurality of network components, wherein selecting the set of network components from the plurality of network components further comprises application code instructions to:
  - rank the plurality of network components in descending order from a highest ranked network component sequentially to a lowest ranked network component based upon a quantity of resolved network faults per network component;
  - calculate a percentage of resolved network faults occurring at each of the plurality of network components;
  - cumulatively sum the calculated percentages beginning with the calculated percentage of the highest ranked network component and continuing the summation in descending order from the highest ranked network component until the cumulative sum reaches a configured threshold; and
  - select the set of network components comprised in the cumulative sum;
- generate a vector comprising extracted features associated with one or more resolved network faults;
- associate each particular network component from the set of network components with one or more of the generated vectors;
- generate training data comprising each particular network component and the associated one or more generated vectors;
- receive a notification that a network fault has occurred;
- access a service application running a machine learning algorithm, operation of the machine learning algorithm being based on the generated training data to predict a fault network component associated with the network fault; and
- receive, from the service application, a notification of the fault network component predicted to be associated with the network fault received in the notification.

16. The system of claim 15, wherein the extracted features are quantifiable values and the extracted features are associated with causes of the one or more resolved network faults.

17. The method of claim 2, wherein the probability distribution model is a Pareto distribution model.

18. The computer programming product of claim 10, wherein the probability distribution model is a Pareto distribution model.

* * * * *